United States Patent

Ebara et al.

Patent Number: 6,103,841
Date of Patent: *Aug. 15, 2000

[54] α-OLEFIN POLYMERS, α-OLEFIN-POLYMERIZING CATALYST AND PROCESS FOR PRODUCING α-OLEFIN POLYMERS

[75] Inventors: Takeshi Ebara, Ichihara; Koji Mizunuma, Kisarazu; Toshio Sasaki, Ichihara; Kazuki Wakamatsu, Sodegaura; Junichi Kimura, Toyonaka; Yoichi Obata, Ichihara, all of Japan

[73] Assignee: Sumitomo Chemical Company, Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,646

[22] Filed: Apr. 30, 1997

Related U.S. Application Data

[62] Division of application No. 08/341,211, Dec. 5, 1994, abandoned.

[30] Foreign Application Priority Data

Dec. 6, 1993 [JP] Japan ...................................... 5-305318
Apr. 20, 1994 [JP] Japan ...................................... 6-081438

[51] Int. Cl.$^7$ ...................................................... C08F 4/58
[52] U.S. Cl. ..................................... 526/125.3; 526/124.2; 526/348.1; 526/351; 502/125
[58] Field of Search .............................. 526/125.3, 124.2, 526/348.1

[56] References Cited

U.S. PATENT DOCUMENTS 4,107,413 8/1978 Giannini et al. .
4,107,414 8/1978 Giannini et al. .

(List continued on next page.)

FOREIGN PATENT DOCUMENTS 0045975 2/1982 European Pat. Off. .
282341 9/1988 European Pat. Off. .

(List continued on next page.)

OTHER PUBLICATIONS

Japan Industrial Standards, JIS K 6758, 'Testing Methods for Polypropylenes', (1981).

(List continued on next page.)

*Primary Examiner*—David W. Wu
*Assistant Examiner*—Caixia Lu-Rutt
*Attorney, Agent, or Firm*—Pillsbury Madison & Sutro, LLP

[57] ABSTRACT

An α-olefin polymer well balanced between stiffness, stickiness, processability, etc., which intrinsic viscosity [η] is in the range of from 0.5 to 10 and which 20° C. xylene-soluble fraction (CXS) content (% by weight) and 105° C. xylene-insoluble fraction (XIS) content (% by weight) satisfy a condition of XIS≦70.00–3.64CXS, provided that CXS is not smaller than 0 and not greater than 15; a specified α-olefin polymerizing catalyst for producing the polymer; a process for producing the polymer using the specified α-olefin polymerizing catalyst; a polypropylene for use in the production of a biaxially oriented film excellent in stretchability and satisfying the conditions (1)–(3) mentioned below; and a biaxially oriented film excellent in stiffness and dimensional stability obtained by stretching the polypropylene:

(1) the content of 20° C. xylene-soluble fraction (CXS) is 3.5% by weight or less, (2) the content of 20° C. xylene-soluble fraction (CXS, % by weight) and the content of 105° C. xylene-insoluble fraction (XIS, % by weight) satisfy the following condition:

XIS≦70.00–3.64CXS, and (3) melt flow rate (MFR) at 230° C. is from 0.5 to 10.0 g/10 minutes.

23 Claims, 1 Drawing Sheet

U.S. PATENT DOCUMENTS

| | | |
|---|---|---|
| 4,156,063 | 5/1979 | Giannini et al. . |
| 4,157,435 | 6/1979 | Toyota et al. . |
| 4,187,196 | 2/1980 | Giannini et al. . |
| 4,226,963 | 10/1980 | Giannini et al. . |
| 4,336,360 | 6/1982 | Giannini et al. . |
| 4,355,144 | 10/1982 | Shiga et al. . |
| 4,412,049 | 10/1983 | Shiga et al. . |
| 4,414,373 | 11/1983 | Shiga et al. . |
| 4,668,753 | 5/1987 | Kashiwa et al. . |
| 4,670,529 | 6/1987 | Kitamura et al. . |
| 4,743,665 | 5/1988 | Sasaki et al. . |
| 4,804,648 | 2/1989 | Job . |
| 4,952,649 | 8/1990 | Kioka et al. . |
| 4,971,937 | 11/1990 | Albizzati et al. . |
| 4,983,561 | 1/1991 | Sasaki et al. . |
| 5,023,223 | 6/1991 | Ebara et al. . |
| 5,093,415 | 3/1992 | Brady et al. . |
| 5,189,124 | 2/1993 | Sasaki et al. . |
| 5,432,244 | 7/1995 | Rebhan . |

FOREIGN PATENT DOCUMENTS

| | | |
|---|---|---|
| 376084 | 7/1990 | European Pat. Off. . |
| 385 765 A2 | 9/1990 | European Pat. Off. . |
| 576413 | 12/1993 | European Pat. Off. . |
| 46-11027 | 3/1971 | Japan . |
| 54-94590 | 7/1979 | Japan . |
| 56-41206 | 4/1981 | Japan . |
| 61-23607 | 1/1986 | Japan . |

OTHER PUBLICATIONS

Kakugo et al., 'Microtacticity Distribution of Polypropylenes Prepared With Heterogeneous Ziegler–Natta Catalysts', Macromolecules 21: 314–319 (1988).

Soga et al. Transition Metal Catalyzed Polymerization: Ziegler–Natta and Metatheris; Polymerization, Cambridge Univ. Press, N.Y. (1988); pp. 266–279.

Seppata et al., Makromal. Chem., 190, pp. 2535–2550 (1989).

# α-OLEFIN POLYMERS, α-OLEFIN-POLYMERIZING CATALYST AND PROCESS FOR PRODUCING α-OLEFIN POLYMERS

This application is a division of application Ser. No. 08/341,211, filed on Dec. 5, 1994, now abandoned.

BACKGROUND OF THE INVENTION

1. Field of the Invention

The present invention relates to α-olefin polymers in which the content of high-stereospecificity polymer expressed by 105° C. xylene-insoluble fraction (XIS) is very low in spite of a low content of low-stereospecificity polymer expressed by 20° C. xylene-soluble fraction (CXS), as well as to an α-olefin-polymerizing catalyst for obtaining such polymers, a process for producing such α-olefin polymers, and a polypropylene for use in the production of biaxially oriented films.

More particularly, the present invention relates to α-olefin polymers low in stickiness due to low CXS, excellent in stretching properties due to low XIS, and successfully usable for formation of films, fibers, blow molded articles, extrusion molded articles, etc., as well as to an α-olefin-polymerizing catalyst for obtaining such polymers, a process for producing α-olefin polymers, a polypropylene obtained by said process and suitable for use in the production of a biaxially oriented film excellent in stiffness and dimensional stability, and biaxially oriented films using said polypropylene.

2. Description of the Related Art

Because of their excellence in transparency, gloss, stiffness, water vapor barrier property, etc., biaxially oriented polypropylene films are extensively used as packaging materials. As the polypropylene used for production of biaxially oriented films, homopolymer of propylene is most conventional, and highly crystalline homopolymer of propylene obtained by the use of a high-stereospecificity catalyst has been used with the aim of improving the film properties, such as stiffness, of biaxially oriented film. However, such highly stereo-specific homopolymer of polypropylene is not good in the stretchability and has a fault that it is apt to make troubles such as film breaking in the process of stretching. Thus, a variety of methods for improving the stretchability of highly crystalline polypropylene have so far been proposed. As one example of such proposals, copolymerization of propylene with a small amount of ethylene is known.

Concretely speaking, JP-B-46-11027 has proposed a process for producing a polypropylene for use in production of films which comprises polymerizing propylene together with a very small amount of ethylene in the presence of a coordination catalyst and a hydro-carbon or chlorinated hydrocarbon solvent so that one mole of the monomer unit in the resulting polymer becomes containing 0.01 mole or less of ethylene unit. Further, in JP-B-64-6211, there is proposed a process for producing a polypropylene improved in stretching properties which comprises feeding propylene together with a small amount of ethylene into polymerization system using a catalyst consisting of an organoaluminum compound and titanium trichloride prepared by reducing titanium tetrachloride with an organoaluminum compound and further activating the reduced product by a treatment using a complex-forming agent, a treatment using an organoaluminum compound, a treatment using titanium tetrachloride or a combination thereof so that the resulting polymer comes to have an ethylene content of 0.1–1.0% by weight. Further, in JP-B-3-4371, there is proposed a process for producing a biaxially oriented polypropylene film excellent in transparency, stiffness and impact resistance by using a polypropylene of which ethylene content is 0.1–2% by mole and isotacticity is in a specified range.

Such processes, however, give no good result because copolymerization of only a small amount of ethylene causes a great deterioration in stereospecificity, a drop in stiffness and the troubles of stickiness, although stretching properties may be improved by these processes to a small extent.

As a method for improving the processing characteristics of the homopolymer, JP-A-61-23607 has proposed a method of using a composition prepared by mixing together two propylene homopolymers different in stereospecificity. Although processability may be somewhat improved by this method, the method requires to use a polypropylene mixture containing 90–10% by weight of a very low stereospecificity homopolymer in which the isotactic pentad fraction of boiling heptane-insoluble part is in the range of from 0.50 to 0.92, due to which the stiffness of polypropylene is sacrificed, the characteristic feature of the homopolymer itself cannot be exhibited and further the problem of stickiness arises.

As have been mentioned above, any of these prior methods are unsatisfactory from the viewpoint of obtaining a biaxially oriented polypropylene exhibiting excellent stiffness and dimensional stability simultaneously while maintaining a good stretchability.

The object of the present invention is to provide a novel α-olefin polymer capable of solving the above-mentioned problems of prior art, an α-olefin polymerizing catalyst for obtaining such a polymer and a process for producing said α-olefin polymer, and further provide a polypropylene for use in the production of biaxially oriented film capable of giving, when subjected to a stretching processing, a biaxially oriented film excellent in stiffness and dimensional stability, and a biaxially oriented film obtained from said polypropylene.

SUMMARY OF THE INVENTION

In view of the above, the present inventors have conducted extensive studies to find that a polypropylene for use in the production of biaxially oriented film capable of giving, when subjected to a stretching processing, a biaxially oriented film exhibiting excellent stiffness and dimensional stability while retaining a good stretchability can be obtained by using a polypropylene produced with a specified catalyst system, said polypropylene being characterized in that the 20° C. xylene-soluble fraction content (referred to as "CXS"; unit: % by weight) of the polypropylene is in a specified range, the 20° C. xylene-soluble fraction content and 105° C. xylene-insoluble fraction content (referred to as "XIS"; unit: % by weight) of the polypropylene are in a specified relation, the polypropylene has a specified complex elastic modulus in a specified temperature range, and melt flow rate (referred to as "MFR"; unit: g/10 minutes) of the polypropylene is in a specified range. Based on this finding, the present invention has been accomplished.

Thus, the present invention relates to an α-olefin polymer obtained by polymerizing an α-olefin having 3 or more carbon atoms, said α-olefin polymer being characterized in that intrinsic viscosity [η] of the polymer is not lower than 0.5 and not higher than 10 and the 20° C. xylene-soluble fraction content (CXS, % by weight) and 105° C. xylene-insoluble fraction content (XIS, % by weight) of the polymer are related to each other according to the following formula:

$$XIS \leq 70.00 - 3.64CXS$$

provided that CXS is not smaller than 0 and not greater than 15. The present invention also relates to a polypropylene for use in the production of biaxially oriented film satisfying the following conditions (1) to (3):

(1) 20° C. xylene-soluble fraction content (CXS) of the polypropylene is 3.5% by weight or below, (2) 20° C. xylene-soluble fraction content (CXS) and 105° C. xylene-insoluble fraction content (XIS, % by weight) of the polypropylene are related to each other according to the following formula:

$$XIS \leq 70.00 - 3.64CXS,$$

and (3) melt flow rate (MFR) of the polypropylene at 230° C. is in the range of from 0.5 to 10.0 g/10 minutes.

The present invention further relates to the above-specified polypropylene for use in production of biaxially oriented film which shows a complex elastic modulus of $1 \times 10^9$ dynes/cm$^2$ in the temperature range of from 134 to 152° C. when a vibration of 110 Hz is applied thereto.

The present invention further relates to the above-specified polypropylene for use in production of biaxially oriented film, wherein said polypropylene for use in production of biaxially oriented film is a polypropylene produced by carrying out a polymerization reaction by the use of a catalyst system consisting of:

(A) a solid catalyst component containing magnesium, titanium, halogen and electron donative compound as essential components, (B) an organoaluminum compound, and (C) an electron donative compound.

Next, the present invention is explained more concretely.

The α-olefin polymer of the present invention is a polymer prepared by polymerizing an α-olefin having 3 or more carbon atoms. Specific examples of the usable α-olefins include straight chain monoolefins such as propylene, butene-1, pentene-1, hexene-1, heptene-1, octene-1, decene-1 and the like; branched chain mono-olefins such as 3-methylbutene-1, 3-methylpentene-1, 4-methylpentene-1 and the like; vinylcyclohexene; and the like. These α-olefins may be used either in the form of a single compound or in the form of a combination or two or more compounds. Of these α-olefins, propylene and butene-1 are preferable as monomers of homopolymerization, and olefin mixtures constituted mainly of propylene or butene-1 are preferable as monomers of copolymerization, and particularly preferred are the use of propylene for homopolymerization and the use of an olefin mixture constituted mainly of propylene for copolymerization. In the copolymerization of the present invention, two or more kinds of olefins selected from ethylene and the above-mentioned α-olefins can be mixed into the monomer. It is also possible to use the compounds having many unsaturated bonds including conjugated dienes and nonconjugated dienes for the copolymerization. A hetero-block copolymerization in which the polymerization is carried out in two or more stages can also be practiced easily.

The α-olefin polymer of the present invention has at intrinsic viscosity [η] of not lower than 0.5 and not higher than 10, preferably not lower than 0.7 and not higher than 8.0, as measured in tetralin solvent at 135° C.

The present invention further relates to a biaxially oriented film produced by subjecting these polypropylenes for use in production of biaxially oriented film to a stretching processing.

The first characteristic feature of the polypropylene obtained according to the present invention consists in that it shows a good stretchability at the time of forming a film. Its second characteristic feature is that the biaxially oriented film obtained by forming the polypropylene into a film is excellent in stiffness and dimensional stability. A more concrete explanation of the present invention will be presented below.

The polypropylene for production of biaxially oriented film according to the present invention contains a specified content of 20° C. xylene-soluble fraction (CXS). The 20° C. xylene-soluble fraction (CXS) content of said polypropylene is 3.5% by weight or less, preferably 3.0% by weight or less, and further preferably 2.5% by weight or less. If CXS content of the polypropylene exceeds 3.5% by weight, the biaxially oriented film obtained therefrom is inferior in stiffness and dimensional stability.

Next, in the polypropylene of the present invention, the 20° C. xylene-soluble fraction (CXS) content and the 105° C. xylene-insoluble fraction (XIS) content are related to each other according to the following formula:

$$XIS \leq 70.00 - 3.64CXS,$$

preferably according to the following formula:

$$XIS \leq 63.64 - 3.64CXS,$$

further preferably according to the following formula:

$$XIS \leq 57.28 - 3.64CXS,$$

and particularly preferably according to the following formula:

$$20.00 - 3.64CXS \leq XIS \leq 57.28 - 3.64CXS.$$

If the above-specified condition is not satisfied, a polypropylene for use in production of biaxially oriented film which can give, when subjected to a stretching processing, a biaxially oriented film simultaneously exhibiting excellent stiffness and dimensional stability while retaining a good stretchability cannot be obtained.

In the present invention, the content of 20° C. xylene-soluble fraction (CXS, % by weight) is determined by dissolving 1 g of polymer powder in 200 ml of boiling xylene, slowly cooling the resulting solution to 50° C., subsequently cooling the solution further to 20° C. with stirring while dipping it in ice water, allowing the solution to stand at 20° C. for 3 hours, filtering off the deposited polymer, evaporating off the xylene from the filtrate, drying the residue at 70° C. under a reduced pressure, and recovering the fraction soluble in 20° C. xylene.

In the present invention, the content of 105° C. xylene-insoluble fraction (XIS, % by weight) is determined according to the method mentioned in the paper of Kakugo et al. [Macromolecules, 21, 314–319 (1988)], namely by dissolving a polymer powder in 135° C. xylene, throwing sea sand thereinto, cooling the mixture to 20° C., again heating the mixture, and measuring the weight (%) of the fraction which is not extracted at 105° C. but extracted at 105–135° C.

CXS of the α-olefin polymer of the invention is not less than 0 and not more than 15% by weight, and preferably not less than 0.1% by weight and not more than 12% by weight.

Melt flow rate (MFR) at 230° C. of the polypropylene of the present invention is from 0.5 to 10.0 g/10 minutes and preferably from 1.0 to 8.0 g/10 minutes. MFR is a parameter representing the average molecular weight of a polymer, and its greater value means a lower average molecular weight.

Additionally saying, a polypropylene of which MFR is 0.5 has [η] of 2.7–3.4, and a polypropylene of which MFR is 10.0 has [η] of 1.4–2.0. If MFR of said polypropylene is higher than the upper limit, stretchability is not good. If MFR is lower than the lower limit, flow property at the time of extrusion is not good.

In the polypropylene of the present invention, it is further desired that the temperature at which the polypropylene shows a complex elastic modulus of $1 \times 10^9$ dynes/cm$^2$ when a vibration of 110 Hz is applied thereto is in the range of 134–152° C. and preferably in the range of 137–145° C., from the viewpoint of obtaining a biaxially oriented film of the present invention well balanced between stretchability, stiffness and dimensional stability.

A biaxially oriented polypropylene film of the present invention can be produced, for example, according to the following method. As the catalyst system used for the production of the polypropylene for biaxially oriented film, a catalyst system consisting of (A) a solid catalyst component containing magnesium, titanium, halogen and an electron donative compound as essential components, (B) an organoaluminum compound and (C) an electron donative component is preferably used.

(a) Solid Catalyst Component (A)

As the solid catalyst component (A) of the present invention containing magnesium, titanium, halogen and an electron donative compound as essential components, those generally called titanium-magnesium complex catalysts can be used. Such solid catalyst component (A) can be obtained by contacting the following magnesium compound, titanium compound and electron donative compound mutually.

As the titanium compound used for the synthesis of solid catalyst component (A), for example, the titanium compounds represented by the following general formula:

$$Ti(OR^1)_a X_{4-a}$$

wherein $R^1$ represents a hydrocarbon group having 1–20 carbon atoms, X represents a halogen atom, and a represents a number satisfying $0 \leq a \leq 4$, can be referred to. More specifically, titanium tetrahalide compounds such as titanium tetrachloride, titanium tetrabromide, titanium tetraiodide and the like, alkoxytitanium trihalide compounds such as methoxytitanium trichloride, ethoxytitanium trichloride, butoxytitanium trichloride, phenoxytitanium trichloride, ethoxytitanium tribromide and the like, dialkoxytitanium dihalide compounds such as dimethoxytitanium dichloride, diethoxytitanium dichloride, dibutoxytitanium dichloride, diphenoxytitanium dichloride, diethoxytitanium dibromide and the like, trialkoxytitanium halide compounds such as trimethoxytitanium chloride, triethoxytitanium chloride, tributoxytitanium chloride, triphenoxytitanium chloride, triethoxytitanium bromide and the like, and tetraalkoxytitanium compounds such as tetramethoxytitanium, tetraethoxytitanium, tetrabutoxy-titanium, tetraphenoxytitanium and the like can be referred to. These titanium compounds may be used either in the form of a single compound or in the form of a mixture of two or more compounds. Further, if desired, these titanium compounds may be used after dilution with a hydrocarbon or halogenated hydrocarbon compound or the like.

As the magnesium compound used in the synthesis of solid catalyst component (A), the reductive magnesium compounds and non-reductive magnesium compounds having a magnesium-carbon bond or a magnesium-hydrogen bond can be used. Specific examples of the reductive magnesium compound include dimethylmagnesium, diethylmagnesium, dipropylmagnesium, dibutylmagnesium, dihexylmagnesium, butylethylmagnesium, ethylmagnesium chloride, butylmagnesium chloride, hexylmagnesium chloride, butylethoxymagnesium, butylmagnesium hydride and the like. If desired, these reductive magnesium compounds may be used in the form of a complex compound with an organoaluminum compound. On the other hand, specific examples of the non-reductive magnesium compounds include magnesium dihalide compounds such as magnesium dichloride, magnesium dibromide, magnesium diiodide and the like; alkoxymagnesium halide compounds such as methoxymagnesium chloride, ethoxymagnesium chloride, butoxymagnesium chloride, isopropoxymagnesium chloride, phenoxymagnesium chloride and the like; dialkoxymagnesium compounds such as diethoxymagnesium, dibutoxymagnesium, diisopropoxymagnesium, diphenoxymagnesium and the like; and magnesium carboxylates such as magnesium laurate, magnesium stearate and the like. If desired, said non-reductive magnesium compound may be a compound synthesized from a reductive magnesium compound according to a known method either previously or at the time of preparation of the solid catalyst component.

As the electron donative compound used in the synthesis of solid catalyst component (A), oxygen-containing electron donative compounds such as alcohols, phenols, ketones, aldehydes, carboxylic acids, esters of organic and inorganic acids, ethers, acid amides, acid anhydrides and the like; nitrogen-containing electron donative compounds such as ammonia, amines, nitriles, isocyanates and the like; etc. can be referred to. Of these electron donative compounds, esters of organic and inorganic acids and ethers are preferred.

As the ester of organic acid, esters of mono- and polycarboxylic acids can be used preferably, of which examples include esters of aliphatic carboxylic acids, esters of olefinic carboxylic acids, esters of alicyclic carboxylic acids and esters of aromatic carboxylic acids. Specific examples thereof are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-octyl phthalate, diphenyl phthalate and the like.

As the esters of inorganic acid, the silicon compounds represented by the following general formula:

$$R^2{}_n Si(OR^3)_{4-n}$$

wherein $R^2$ represents a hydrocarbon group having 1–20 carbon atoms or a hydrogen atom, $R^3$ represents a hydrocarbon group having 1–20 carbon atoms, and n represents a number satisfying $0 \leq n \leq 4$, can be used preferably. Specific examples of said silicon compound include tetramethoxysilane, tetraethoxysilane, tetrabutoxysilane, tetraphenoxysilane, methyltrimethoxysilane, ethyltrimethoxysilane, butyltrimethoxysilane, isobutyltrimethoxysilane, t-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane, dibutyldimethoxysilane, diisobutyldimethoxysilane, di-t-butyldimethoxysilane, butylmethyldimethoxysilane, butylethyldimethoxysilane, t-butylmethyldimethoxysilane, hexylmethyldimethoxysilane, hexylethyldimethoxysilane, dodecylmethyldimethoxysilane, dicyclopentyldimethoxysilane, cyclopentylmethyldimethoxysilane, cyclopentylethyldimethoxysilane, cyclopentylisopropyldimethoxysilane, cyclopentylisobutyldimethoxysilane, cyclopentyl-t-butyldimethoxysilane, dicyclohexyldimethoxysilane, cyclohexylmethyldimethoxysilane, cyclohexylethyldimethoxysilane, cyclohexylisopropyldimethoxy-silane, cyclohexylisobutyldimethoxysilane, cyclohexyl-t-butyldimethoxysilane, diphenyldimethoxysilane, phenylmethyl-dimethoxysilane, vinylmethyldimethoxysilane, methyltriethoxy-silane, ethyltriethoxysilane, butyltriethoxysilane, isobutyltriethoxysilane, t-butyltriethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-t-butyldiethoxysilane, butylmethyldiethoxysilane, butylethyldiethoxysilane, t-butylmethyldiethoxysilane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-t-butoxysilane, 2-norbornanetrimethoxysilane, 2-norbornanetriethoxysilane, 2-norbornanemethyldimethoxysilane, trimethylphenoxysilane, methyltriallyloxysilane, and the like.

As the ethers, the dialkyl ether compounds such as those represented by the following general formula:

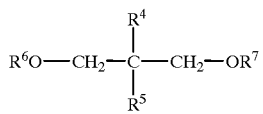

wherein $R^4$ to $R^7$ each represents linear or branched alkyl group having 1–20 carbon atoms, alicyclic group, aryl group, alkylaryl group or arylalkyl group, provided that $R^4$ to $R^7$ may be identical with or different from one another and each of $R^4$ and $R^5$ may also be a hydrogen atom, can be referred to. Specific examples of the ether compound include diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane and the like.

Among these electron donative compounds, the ester compounds are particularly preferred.

As the method for producing such solid catalyst component, for example, the methods disclosed in JP-B-52-39431, JP-B-52-36786, JP-A-54-94590, JP-A-55-36203, JP-A-56-41206, JP-A-57-63310, JP-A-57-59916, JP-A-58-83006, JP-A-61-218606, JP-A-1-319508, JP-A-3-706, etc. can be referred to.

These methods can be exemplified by the following:

(1) a method of reacting a liquid magnesium compound or a complex compound consisting of a magnesium compound and an electron donative compound with a depositing agent and thereafter treating the reaction product with a titanium compound or a combination of titanium compound and electron donative compound;

(2) a method of treating a solid magnesium compound or a complex compound consisting of a solid magnesium compound and an electron donative compound with a titanium compound or a combination of titanium compound and electron donative compound;

(3) a method of reacting a liquid magnesium compound with a liquid titanium compound in the presence of an electron donative compound and thereby depositing a solid titanium composite compound;

(4) a method of further treating the reaction product obtained by (1), (2) or (3) with a titanium compound or a combination of electron donative compound and titanium compound;

(5) a method of reducing an alkoxytitanium compound with an organomagnesium compound such as Grignard reagent or the like in the presence of an organic silicon compound having a Si—O bond to obtain a solid product, followed by treating said solid product with an ester compound, an ether compound and titanium tetrachloride;

(6) a method of mutually contacting and reacting a metal oxide, dihydrocarbylmagnesium and a halogen-containing alcohol to obtain a product, followed by treating or not treating the product with a halogenating agent and then contacting the product with an electron donative compound and a titanium compound;

(7) a method of treating or not treating a magnesium compound such as a magnesium salt of organic acid, alkoxymagnesium or the like with a halogenating agent followed by contacting the magnesium compound with an electron donative compound and a titanium compound; and (8) a method of treating the compound obtained in (1) to (7) with any one of halogen, halogen compound and aromatic hydrocarbon.

Among these methods for synthesizing a solid catalyst, the methods (1) to (5) are preferred, and the method (5) is particularly preferred.

Although such solid catalyst component (A) can be used in itself alone, it may also be used after impregnation into a porous material such as inorganic oxides, organic polymers and the like, if desired. As said porous inorganic oxide, $SiO_2$, $Al_2O_3$, MgO, $TiO_2$, $ZrO_2$, $SiO_2$—$Al_2O_3$ composite oxide, MgO—$Al_2O_3$ composite oxide, MgO—$SiO_2$—$Al_2O_3$ composite oxide and the like can be referred to. As said porous organic polymer, polystyrene type, polyacrylic ester type, polyacrylonitrile type, polyvinyl chloride type, and polyolefin type of polymers can be referred to, of which specific examples include polystyrene, styrene-divinylbenzene copolymer, styrene-n,n'-alkylenedimethacrylamide copolymer, styrene-ethylene glycol dimethyl methacrylate copolymer, polyethyl acrylate, methyl acrylate-divinylbenzene copolymer, ethyl acrylate-divinylbenzene copolymer, polymethyl methacrylate, methyl methacrylate-divinylbenzene copolymer, polyethyleneglycol dimethyl methacrylate, polyacrylonitrile, acrylonitrile-divinylbenzene copolymer, polyvinyl chloride, polyvinylpyrrolidine, polyvinylpyridine, ethylvinylbenzene-divinylbenzene copolymer, polyethylene, ethylene-methyl acrylate copolymer, polypropylene and the like.

Of these porous materials, $SiO_2$, $Al_2O_3$ and styrene-divinylbenzene copolymer are preferred.

(b) Organoaluminum Compound (B)

The organoaluminum compounds which can be used as component (B) of the present invention are those having at least one Al—carbon bond in one molecule.

Typical organoaluminum compounds of the present invention are represented by the following general formulas:

$$R^8_m AlY_{3-m}$$

$$R^9 R^{10} Al-O-AlR^{11} R^{12}$$

wherein $R^8$ to $R^{12}$ each represents a hydrocarbon group having 1–8 carbon atoms, provided that $R^8$ to $R^{12}$ may be identical with or different from one another, Y represents halogen, hydrogen or alkoxy group, and m represents a number satisfying $2 \leq m \leq 3$. Specific examples of such organoaluminum compound include trialkylaluminums such as triethylaluminum, triisobutylaluminum, trihexylaluminum and the like, dialkylaluminum hydrides such as diethylaluminum hydride, diisobutylaluminum hydride and the like, mixtures of a trialkylaluminum and a dialkylaluminum halide such as mixture of triethylaluminum and diethylaluminum chloride, and alkylalumoxanes such as tetraethyldialumoxane, tetrabutyldialumoxane and the like.

Of these organoaluminum compounds, preferred are trialkylaluminums, mixtures of a trialkylaluminum and a dialkylaluminum halide and alkylalumoxanes, and particularly preferred are triethylaluminum, triisobutylaluminum, mixture of triethylaluminum and diethylaluminum chloride, and tetraethyldialumoxane.

(C) Electron Donative Catalyst Component (C)

As the electron donative catalyst component (C), those satisfying the following conditions are used. Thus, an α-olefin polymer obtained by using such an electron donative catalyst component (C) together with the above-mentioned solid catalyst component (A) and organoaluminum compound (B) in a polymerization must have an intrinsic viscosity [η] of not lower than 0.1 and not higher than 15 and the 20° C. xylene soluble fraction (CXS) content (% by weight) and the 105° C. xylene insoluble (XIS) fraction content (% by weight) of said polymer must satisfy the following condition:

XIS≦70.00−3.64CXS wherein CXS is not smaller than 0 and not greater than 15.

As the electron donative compound serving as electron donative catalyst component (C) of the present invention, the electron donative compounds used for preparation of solid catalyst component (A) can be used. Of such electron donative compounds, the organic silicon compounds mentioned below are particularly preferred.

Thus, as said organic silicon compounds, those represented by the following general formula:

$$R^2_n Si(OR^3)_{4-n}$$

wherein $R^2$ represents a hydrocarbon group having 1–20 carbon atoms or a hydrogen atom, $R^3$ represents a hydrocarbon group having 1–20 carbon atoms and n represents a number satisfying $0 \leq n \leq 4$, can be referred to.

Specific examples of said organic silicon compounds include tetramethoxysilane, tetraethoxysilane, tetrabutoxysilane, tetraphenoxysilane, methyltrimethoxysilane, ethyltrimethoxysilane, butyltrimethoxysilane, isobutyltrimethoxysilane, isopropyltrimethoxysilane, vinyltrimethoxy-silane, dimethyldimethoxysilane, diethyldimethoxysilane, dipropyldimethoxysilane, propylinethyldimethoxysilane, dibutyldimethoxysilane, butylmethyldimethoxysilane, butylethyldimethoxysilane, hexylmethyldimethoxysilane, hexylethyldimethoxysilane, dodecylmethyldimethoxysilane, vinylmethyldimethoxysilane, methyltriethoxysilane, ethyltriethoxysilane, butyltriethoxysilane, isobutyltriethoxysilane, isopropyltriethoxysilane, vinyltriethoxysilane, dimethyldiethoxysilane, diethyldiethoxysilane, dipropyldiethoxysilane, propylmethyldiethoxysilane, dibutyldiethoxysilane, butylmethyldiethoxysilane, butylethyldiethoxysilane, hexylmethyldiethoxysilane, hexylethyldiethoxysilane, dodecylmethyldiethoxysilane, vinylmethyldiethoxysilane, ethyltriisopropoxysilane, vinyltributoxysilane, phenyltri-t-butoxysilane, trimethylphenoxysilane, methyltriallyloxysilane, and the like.

Among the organic silicon compounds, those represented by the following general formula:

$$R^{13} R^{14} Si(OR^{15})_2$$

are preferably used as the electron donative catalyst component (C). In the general formula presented above, $R^{13}$ represents $C_1$–$C_{20}$ hydrocarbon group, preferably straight chain hydrocarbon group and particularly preferably straight chain alkyl group such as methyl, ethyl, propyl, butyl, pentyl and the like; $R^{14}$ represents $C_1$–$C_5$ hydrocarbon group, preferably straight chain hydrocarbon group and particularly preferably $C_1$ hydrocarbon group; and $R^{15}$ represents $C_1$–$C_{20}$ hydrocarbon group and preferably $C_1$–$C_5$ hydrocarbon group.

Specific examples of the organic silicon compound which can be used as such electron donative catalyst component (C) include dimethyldimethoxysilane, ethylmethyldimethoxy-silane, propylmethyldimethoxysilane, butylmethyldimethoxysilane, pentylmethoxydimethoxysilane, hexylmethyldimethoxy-silane, heptylmethyldimethoxysilane, octylmethyldimethoxysilane, dodecylmethyldimethoxy-silane and the like.

The polymerization process for obtaining an α-olefin polymer of the present invention is not particularly limited, so far as the polymerization reaction is carried out under a condition that the formed α-olefin polymer has an intrinsic viscosity [η] of not lower than 0.5 and not higher than 10, and the 20° C. xylene-soluble fraction (CXS) content and the 105° C. xylene insoluble fraction (XIS) content of the polymer, both expressed in terms of % by weight, satisfy the following condition:

XIS≦70.00−3.64CXS provided that CXS is not smaller than 0 and not greater than 15.

In the polymerization process for obtaining an α-olefin polymer of the present invention, the method for feeding each of the catalyst components to the polymerization reactor is not particularly limited, except that the catalyst components must be fed in a moisture-free state either in an inert gas such as nitrogen, argon, butane or the like or in an olefin gas such as propylene or the like.

In carrying out the polymerization by the use of said catalyst system, the solid catalyst component (A), the organoaluminum compound (B) and the electron donative catalyst component (C) may be fed either separately or after mutually contacting any two members of them previously.

In the polymerization process for obtaining a polypropylene of the present invention, a preliminary polymerization may be carried out before carrying out the main polymerization process, if desired.

Thus, the preliminary polymerization is effected, for example, by feeding a small amount of propylene in the presence of solid catalyst component (A) and organoaluminum compound (B), and it is preferably carried out in the state of a slurry. As the solvent used for preparing the slurry, inert hydrocarbons such as ropane, butane, isobutane, pentane, isopentane, hexane, heptane, octane, cyclohexane, benzene or toluene can be referred to. In preparing the slurry, liquid propylene may be used, if desired, in place of a part or the whole of the inert hydrocarbon solvent.

In carrying out the preliminary polymerization, the amount of organoaluminum compound may be selected from such a wide range as from 0.5 to 700 moles per mole of titanium atom in the solid catalyst component. The amount of organoaluminum compound is preferably from 0.8 mole to 500 moles, and particularly preferably from 1 mole to 200 moles, both on the same basis as above.

The amount of propylene consumed in the preliminary polymerization is from 0.01 to 1,000 g, preferably from 0.05 to 500 g, and particularly preferably from 0.1 to 200 g, per gram of the solid catalyst component.

In carrying out the preliminary polymerization, the concentration of slurry is preferably from 1 to 500 g of solid catalyst component per liter of solvent, and particularly preferably from 3 to 300 g solid catalyst component per liter of solvent. The temperature of preliminary polymerization is preferably from −20° C. to 100° C., and particularly preferably from 0° C. to 80° C. In the process of the preliminary polymerization, the partial pressure of propylene in the gas phase is preferably from 0.01 to 20 kg/cm$^2$ and particularly preferably from 0.1 to 10 kg/cm$^2$, provided that this condition is not applicable to propylene which is in a liquid state at the pressure and temperature of preliminary polymerization. Although the period of time of the preliminary polymerization is not critical, it is usually from 2 minutes to 15 hours.

In carrying out the preliminary polymerization, the method for feeding solid catalyst component, organoaluminum compound and propylene may be any of a method of contacting a solid catalyst component with an organoaluminum compound and thereafter feeding propylene and a method of contacting a solid catalyst component with propylene and thereafter feeding an organoaluminum compound. The method for feeding propylene may be any of a method of portionwise feeding propylene while keeping the inner atmosphere of polymerization reactor at a prescribed pressure and a method of wholly feeding a prescribed quantity of propylene at the beginning. It is also possible to add a chain transfer agent such as hydrogen or the like in order to regulate molecular weight of the polymer formed.

In subjecting the solid catalyst component to a preliminary polymerization with a small amount of propylene in the presence of an organoaluminum compound, the preliminary polymerization may be carried out in the presence of an electron donative compound, if desired. The electron donative compound used for this purpose is a part or the whole of the above-mentioned electron donative catalyst component (C). Its amount is 0.01–400 holes, preferably 0.02–200 moles and particularly preferably 0.03–100 moles per mole of titanium atom present in the solid catalyst component, and is 0.003–5 moles, preferably 0.005–3 moles and particularly preferably 0.01–2 moles per mole of the organoaluminum compound.

In carrying out the preliminary polymerization, the method for feeding the electron donative compound is not particularly limited. Thus, an electron donative compound may be fed independently of an organoaluminum compound, or after a previous contact with an organoaluminum compound. The propylene used in the preliminary polymerization may be identical with or different from the propylene used in the main polymerization step which will be mentioned later. After carrying out a preliminary polymerization in the above-mentioned manner or without carrying out the preliminary polymerization, a main polymerization of propylene can be effected in the presence of a polymerization catalyst consisting of, for example, the above-mentioned solid catalyst component (A), organoaluminum compound (B) and electron donative catalyst component (C).

The solid catalyst component, organoaluminum compound and electron donative catalyst component may be fed either separately or after previously contacting any two of them.

In the main polymerization, the amount of the organoaluminum compound may be selected from such a wide range as from 1 mole to 1,000 moles per mole of titanium tom in the solid catalyst component. Particularly preferably, however, the amount of the organoaluminum compound is in the range of from 5 to 600 moles on the same basis as above.

In the main polymerization, the amount of the electron donative catalyst component (C) is used in an amount of from 0.1 to 2,000 moles, preferably from 0.3 to 1,000 moles and particularly preferably from 0.5 to 800 moles per mole of the titanium atom present in the solid catalyst component; and its amount is from 0.001 to 5 moles, preferably from 0.005 to 3 moles and particularly preferably from 0.01 to 1 mole, per mole of the organoaluminum compound.

The main polymerization can be effected at a temperature ranging from −30° C. to 300° C. and preferably from 20° C. to 180° C. Although there is no limitation upon the polymerization pressure, a pressure of from ordinary pressure to 100 kg/cm$^2$ and preferably from about 2 to about 50 kg/cm$^2$ is usually adopted from the viewpoint of industrial and economical practicabilities. As the mode of polymerization, batch process and continuous process can both be adopted. A slurry polymerization process or a solution polymerization process using an inert hydrocarbon solvent such as propane, butane, isobutane, pentane, hexane, heptane, octane and the like, a bulk polymerization process using an olefin keeping liquid at the polymerization temperature as a medium, and a gas phase polymerization process can also be practiced.

In the main polymerization, a chain transfer agent such as hydrogen and the like may be added for the purpose of regulating molecular weight of the polymer, if desired.

Into the polypropylene of the present invention, ethylene and/or α-olefin having 4 or more carbon atoms may be copolymerized, unless the object of the present invention is damaged by their copolymerization.

Into the polypropylene of the present invention, a stabilizer, a slipper, an antistatic agent, an anti-blocking agent and the like may be incorporated, unless the object of the present invention is damaged by adding these additives.

A variety of inorganic and organic fillers may also be added, unless the object of the present invention is damaged by their addition.

The polypropylene of the present invention is made into a film and subjected to a stretching processing usually in the following manner to give a biaxially oriented film. Thus, the propylene is melted in an extruder, and thereafter extruded from a T die and cooled and solidified by means of cooling rolls to give a sheet-form material. Subsequently, the sheet thus obtained is pre-heated and stretched in the longitudinal direction by means of a number of heating rolls, and then laterally stretched by means of a heating oven consisting of a pre-heating part, a stretching part and a heat-treating part, after which it is subjected to a corona treatment if desired, and finally wound up. Although the melting temperature of the polypropylene varies depending on molecular weight, the above treatment is usually carried out at a temperature of from 230° C. to 290° C. The temperature of longitudinal stretching is from 130° C. to 150° C., and the draw ratio in the longitudinal direction is usually from 4 to 6. The temperature of lateral stretching is from 150° C. to 165° C., and the draw ratio in the lateral direction is usually from 8 to 10.

The biaxially oriented polypropylene film produced in the above-mentioned manner is more excellent in stiffness and dimensional stability than prior biaxially oriented polypropylene films, while retaining a good stretching property.

DESCRIPTION OF THE PREFERRED EMBODIMENTS

Next, the present invention is explained in more detail with reference to the following examples. The invention is by no means limited by these examples, unless essentiality of the invention is exceeded. The characteristic properties referred to in the examples and comparative examples were measured in the following manner.

(1) 20° C. Xylene-soluble Fraction (CXS) Content; % by Weight

Five grams of a polypropylene was completely dissolved in 500 ml of boiling xylene, cooled to 20° C., and allowed to stand for at least 4 hours. The deposited matter was filtered off, and the filtrate was concentrated to dryness and further dried at 70° C. under a reduced pressure, after which the residue was weighed.

(2) 105° C. Xylene-insoluble Fraction (XIS) Content; % by Weight

According to the method of Kakugo et al. [Macromolecules, 21, 314–319 (1988)], a polypropylene was dissolved in xylene at 130° C., sea sand was thrown into the resulting solution, the mixture was cooled to 20° C. and again heated. The weight (%) of a fraction which was not extracted at 105° C. and extracted in the temperature range exceeding 105° C. and not exceeding 135° C. was measured.

(3) Intrinsic Viscosity (referred to as [η])

Measured in tetralin solvent at 135° C.

(4) Weight Average Molecular Weight/Number Average Molecular Weight Ratio (referred to as Mw/Mn)

Measured by gel permeation chromatography (GPC) in o-chlorobenzene solvent at 145° C.

(5) Temperature at which a Complex Elastic Modulus of $1 \times 10^9$ dynes/cm$^2$ is shown when a vibration of 110 Hz is applied (T1); °C.

According to JIS K6758-81, a polypropylene was formed into a press sheet having a thickness of 0.25 mm, from which test pieces having a length of 40 mm, a width of 2 mm and a thickness of 0.25 mm were cut out. While applying a vibration of 110 Hz to the test piece with Automatic Dynamic Viscoelasticity Measuring Machine (RHEOBIBRON DV-II-EA, manufactured by Orientec Co., td.), the temperature at which a complex elastic modulus of $1 \times 10^9$ dynes/cm$^2$ was shown was measured.

(6) Melt Flow Rate (MFR); g/10 Minutes

Measured according to JIS K7210, condition-14.

(7) Haze; %

Measured according to ASTM D1103.

(8) Young's Modulus; kg/cm$^2$

Test pieces having a width of 20 mm were cut out in the longitudinal direction (MD) on the one hand and in the lateral direction (TD) on the other hand. S—S curve was written at a chuck distance of 60 mm and a tensile speed of 5 mm/minute, from which initial elastic modulus was determined.

(9) Dimensional Stability; %

A filmy test piece having a length of 200 mm and a width of 100 mm was cut out in the longitudinal direction (MD). A load of 1 kg was applied thereto in the longitudinal direction and the test piece was kept in this state at 40° C. for 120 hours, after which elongation was measured and taken as dimensional stability.

(10) Stretchability

According to JIS K6758–81, a polypropylene was formed into a press sheet having a thickness of 500μ, from which a sample of 90 mm×90 mm was cut out. The sample was biaxially oriented under the following conditions. A case that no good film was obtained due to neven stretching or stretching cracking was expressed by efective stretchability (x) and a case that a good film as obtained was expressed by good stretchability (o).

Stretching machine: Biaxial Stretching Tester manufactured by Toyo Seiki Co.

Temperature: 135° C.

Thermal inertia time: 3 minutes

Draw ratio: 5×5

Stretching speed: 5 m/minute.

EXAMPLE 1

(a) Synthesis of Organomagnesium Compound

After replacing the inner atmosphere of a 1,000 ml flask equipped with a stirrer, a reflux condenser, a dropping funnel and a thermometer with argon gas, 32.0 g of sliced metallic magnesium for Grignard reaction was thrown into the flask. The dropping funnel was charged with 120 g of butyl chloride and 500 ml of dibutyl ether, and about 30 ml of the mixture was dropped onto the magnesium in the flask to start a reaction. After starting the reaction, the mixture was continuously dropped for 4 hours at 50° C. After the dropping, the reaction was continued for an additional one hour at 60° C. Then, the content of the flask was cooled to room temperature, and the solid matter was filtered off. A part of the reacted solution was sampled out, the butylmagnesium chloride present in the solution was hydrolyzed with 1N sulfuric acid, and the excessive sulfuric acid was back titrated with 1N aqueous solution of sodium hydroxide to determine the concentration of butylmagnesium chloride, using phenolphthalein as an indicator. As the result, the concentration was 2.1 moles/liter.

(b) Synthesis of Solid Product

After replacing the inner atmosphere of a 500 ml flask equipped with a stirrer and a dropping funnel with argon gas, 290 ml of hexane, 7.7 g (23 mmoles) of tetrabutoxytitanium and 75.0 g (360 mmoles) of tetraethoxysilane were thrown into the flask to prepare a homogeneous solution. Then, 181 ml of the solution of organomagnesium compound synthesized in (a) was slowly dropped into the flask from the dropping funnel over a period of 3.5 hours, while keeping the inner temperature of the flask at 5° C. After completing the dropping, the content of the flask was stirred at room temperature for an additional one hour and then separated into solid and liquid phases. The solid product was three times washed with each 300 ml portion of hexane and then three times with each 300 ml portion of toluene, after which 300 ml of toluene was added thereto.

A part of the solid product slurry was sampled out and its composition was analyzed to reveal that the solid product contained 2.1% by weight of titanium atom, 36.2% by weight of ethoxy group and 3.8% by weight of butoxy group. Concentration of the slurry was 0.125 g/ml.

(c) Synthesis of Ester-treated Solid

The supernatant of the slurry (125 ml) was withdrawn, 45.8 ml (171 mmoles) of diisobutyl phthalate was added thereto and reacted at 95° C. for 30 minutes. After the reaction, the solid matter was separated from the liquid phase and twice washed with each 287 ml portion of toluene.

(d) Synthesis of Solid Catalyst Component (activating treatment)

After completing the washing treatment of (c), 74.5 ml of toluene, 2.9 ml (11 mmoles) of diisobutyl phthalate, 6.3 ml (37 mmoles) of butyl ether and 99 ml (0.90 mole) of titanium tetrachloride were introduced into the flask and reacted at 100° C. for 3 hours. After the reaction, the solid matter was separated from liquid phase and twice washed each 287 ml portion of toluene at the same temperature as above. Then, 74.5 ml of toluene, 6.3 ml (37 mmoles) of butyl ether and 50 ml (0.45 mole) of titanium tetrachloride were added and reacted at 100° C. for one hour. After the reaction, the solid matter was separated from liquid phase at that temperature, four times washed with each 287 ml portion of toluene, three times washed with each 287 ml portion of hexane, and dried under reduced pressure to obtain 46 g of a solid catalyst component.

The solid catalyst component thus obtained contained 2.2% by weight of titanium atom, 10.7% by weight of phthalic ester, 0.7% by weight of ethoxy group and 0.3% by weight of butoxy group.

(e) Polymerization of Propylene

After replacing the inner atmosphere of a stainless steel-made autoclave equipped with a stirrer and having a capacity of 3 liters with argon gas, 2.6 mmoles of triethylaluminum, 0.065 immole of n-propylmethyldimethoxysilane and 5.9 mg of the solid catalyst component synthesized in (d) were charged, to which was fed hydrogen gas up to a partial pressure of 0.33 kg/cm$^2$. Then, after feeding 780 g of liquefied propylene, temperature of the autoclave was elevated to 80° C. and a polymerization was carried out at 80° C. for one hour. After the polymerization, the unreacted monomer was purged and the polymer formed was dried at 60° C. for 2 hours under a reduced pressure. Thus, 130 g of a polypropylene powder was obtained.

This means that the yield of polypropylene per gram of solid catalyst component (hereinafter, referred to as PP/Cat) was 22,000 (g/g). The proportion of 20° C. xylene-soluble fraction (CXS) was 11.7% by weight, and the proportion of 105° C. xylene-insoluble fraction (XIS) was 25.1% by weight, both based on total yield of the polymer. Intrinsic viscosity ([η]) of the polymer was 1.22, and the weight average molecular weight/number average molecular weight ratio (Mw/Mn) of the polymer was 4.4. The conditions and results of the polymerization are summarized in Table 1.

EXAMPLES 2–4

(a) Polymerization of Propylene

Propylene was polymerized in the same manner as in Example 1(e), except that the amount of n-propylmethyldimethoxysilane was altered to the amounts shown in Table 1. Conditions and results of the polymerization are summarized in Table 1.

EXAMPLES 5 AND 6

(a) Polymerization of Propylene

Propylene was polymerized in the same manner as in Example 1 (e), except that the n-propylmethyldimethoxysilane was replaced with the compounds shown in Table 1 of which amounts were as shown in Table 1. Conditions and results of the polymerization are summarized in Table 1.

COMPARATIVE EXAMPLES 1–5

(a) Polymerization of Propylene

Propylene was polymerized in the same manner as in Example 1 (e), except that the n-propylmethyldimethoxysilane was replaced with the compounds shown in Table 1 of which amounts were as shown in Table 1. Conditions and results of the polymerization are summarized in Table 1.

COMPARATIVE EXAMPLE 6

(a) Synthesis of Solid Catalyst Component

A suspension was prepared by adding 47.6 g (500 mmoles) of anhydrous aluminum chloride to 250 ml of decane and 234 ml (1,500 mmoles) of 2-ethylhexyl alcohol and heating and reacting the mixture at 130° C. for 2 hours. Then, 11.1 g (75 mmoles) of phthalic anhydride was added to the suspension and stirred for one hour at 130° C. to dissolve the phthalic anhydride in the suspension. After cooling the resulting homogeneous solution to room temperature, the whole quantity of the solution was dropwise added to 2,000 ml (18 moles) of titanium tetrachloride kept at −20° C., over a period of one hour. After the addition, temperature of the resulting mixture was elevated to 110° C. in 4 hours. When the temperature had reached 110° C., 28.0 ml (140 mmoles) of diisobutyl phthalate was added, and the resulting mixture was kept at that temperature for 2 hours with stirring. After reacting the mixture for 2 hours, the solid matter was collected by filtration at an elevated temperature, and the solid matter was again suspended in 2,000 ml of titanium tetrachloride and reacted at 110° C. for 2 hours. After the reaction, the solid matter was again collected by filtration at an elevated temperature, five times washed with each 300 ml portion of decane at 110° C., three times washed with each 500 ml portion of hexane at room temperature, and dried under a reduced pressure to obtain a solid catalyst component. The solid catalyst component contained 2.0% by weight of titanium atom, 20.0% by weight of magnesium atom, and 4.2% by weight of diisobutyl phthalate.

(b) Polymerization of Propylene

After replacing the inner atmosphere of a stainless steel-made autoclave equipped with a stirrer and having a capacity of 3 liters with argon gas, 2.6 mmoles of triethylaluminum, 0.26 mmole of cyclohexylethyldimethoxysilane and 8.5 mg of the solid catalyst component synthesized in (a) were charged, and hydrogen gas was fed up to a partial pressure of 0.33 kg/cm$^2$. Then, 780 g of liquefied propylene was charged, the temperature of autoclave was elevated to 80° C., and a polymerization was carried out at 80° C. for one hour. After completion of the polymerization, the unreacted monomer was purged. The polymer thus formed was dried at 60° C. for 2 hours under a reduced pressure to obtain 174 g of a polypropylene powder.

This means that PP/Cat=20,500 (g/g). CXS=2.4% by weight; XIS=72.2% by weight; [η]=1.77; and Mw/Mn=4.2. Conditions and results of the polymerization are summarized in Table 1.

COMPARATIVE EXAMPLE 7
(a) Polymerization of Propylene

Propylene was polymerized in the same manner as in Comparative Example 6(b), except that the cyclohexylethyldimethoxysilane was replaced with phenyltrimethoxysilane. Conditions and results of the olymerization are summarized in Table 1.

COMPARATIVE EXAMPLE 8
(a) Polymerization of Propylene

After replacing the inner atmosphere of a stainless steel-made autoclave equipped with a stirrer and having a capacity of one liter with argon gas, 12.4 mmoles of diethylaluminum chloride, 0.186 mmole of methyl methacrylate and 17.3 mg of a $TiCl_3$ type catalyst (Cata-01 catalyst manufactured by Solvay-Marubeni Chemicals Co., Ltd.) were charged, and hydrogen gas was fed up to a partial pressure of 0.66 $kg/cm^2$. Then, 280 g of liquefied propylene was charged, temperature of the autoclave was elevated to 65° C., and a polymerization was carried out at 65° C. for 2 hours. After completing the polymerization, the unreacted monomer was purged. The polymer thus formed was dried at 60° C. for 2 hours under a reduced pressure to obtain 96 g of a polypropylene powder.

This means that PP/Cat=5,550 (g/g). CXS=1.8% by weight; XIS=74.1% by weight; [η]=2.18; and Mw/Mn=6.1. Conditions and results of the polymerization are summarized in Table 1.

EXAMPLE 7
(e) Preliminary Polymerization

A SUS-made autoclave equipped with a stirrer and having a capacity of 3 liters was charged with 1.5 liters of thoroughly dehydrated and deaerated n-hexane, 37.5 mmoles of triethylaluminum, 3.75 mmoles of n-propylmethyldimethoxysilane and 30 g of the solid catalyst component prepared in Example 1(d). While maintaining the inner temperature of the autoclave at 15° C., 30 g of propylene was continuously fed over a period of 45 minutes to carry out a preliminary polymerization. The preliminary polymer slurry thus obtained was transferred to a SUS-made autoclave equipped with a stirrer and having a capacity of 150 liters, 100 liters of sufficiently purified liquefied butane was added, and the mixture was preserved while keeping it at a temperature not exceeding 10° C.

(f) Polymerization of Propylene

In a fluidized bed type reactor equipped with a stirrer and having an inner volume of 1 $m^3$, a continuous gas phase polymerization of propylene was carried out at a polymerization temperature of 75° C. and a polymerization pressure of 18 $kg/cm^2G$ under a condition of feeding propylene and hydrogen so as to maintain the hydrogen concentration in the gas phase at 0.1%, while feeding 50 mmoles/Hr of triethylaluminum (hereinafter referred to as TEA), 15 mmoles/Hr of n-propylmethyldimethoxysilane (hereinafter referred to as nPMDMS) and 2.0 g/Hr of the preliminary polymer slurry prepared in (e) as a solid catalyst component. As a result, 18.1 kg/Hr of a powdery polymer was obtained. As calculated from the retention in the polymerization reactor and the formation of polymer, the mean residence time was 3.3 hours and the amount of polymer per solid catalyst component, namely PP/Cat, was 9,050 g/g.

Next, an antioxidant was added to the powdery polymer obtained above, and the mixture was granulated by means of an extruder to obtain a pellet. Fundamental properties of the pellet are shown in Table 2.

Next, the polymer pellet was melted and extruded at 270° C. by means of a T-die extruder equipped with a screw of 65 mm diameter, and then rapidly cooled by means of cooling rolls of 30° C. to obtain a sheet. The sheet was longitudinally stretched while heating it at 145° C., then laterally stretched while heating it with hot air of 157° C., and then subjected to a stretch heat treatment at 165° C. to obtain a biaxially oriented film having a thickness of 20μ. Table 3 illustrates properties of the film.

EXAMPLE 8

A pellet was prepared in the same manner as in Example 7, except that, in the polymerization of propylene according to Example 7(f), the feed of nPMDMS was altered. Table 2 illustrates fundamental properties of the pellet thus obtained.

Table 3 illustrates the properties of a biaxially oriented film which has been subjected to a stretching processing under the same conditions as in Example 7.

EXAMPLE 9

(a) Synthesis of Organomagnesium Compound, (b) Synthesis of Solid Catalyst Component, (c) Synthesis of Ester-treated Solid, and (d) Synthesis of Solid Catalyst Component (activating treatment) were Performed in the Same Manner as in Example 1.

(e) Preliminary Polymerization was Performed in the Same Manner as in Example 7 to Produce a Preliminary Polymer Slurry.

(f) Polymerization of Propylene

A slurry polymerization was carried out, using liquefied propylene as a medium. Thus, in a polymerization reactor equipped with a stirrer and having an inner volume of 300 liters, a continuous polymerization was carried out while feeding 57 kg/Hr of liquefied polypropylene, 50 mmoles/Hr of TEA, 15 mmoles/Hr of nPMDMS and 1.0 g/Hr of the preliminary polymer slurry prepared in Example 7(e) as a solid catalyst component, feeding hydrogen gas so as to maintain the hydrogen concentration in the gas phase part of the polymerization reactor at 0.3%, keeping the polymerization temperature at 70° C. and withdrawing the polymer slurry so as to maintain a constant level of liquid surface in the polymerization reactor. As a result, a powdery polymer was obtained.

By granulating the powdery polymer by means of an extruder under the same conditions as in Example 7, a pellet was obtained. Table 2 illustrates the fundamental properties of the pellet.

Table 3 illustrates the properties of a biaxially oriented film which has been subjected to a stretching processing under the same conditions as in Example 7.

COMPARATIVE EXAMPLE 9

A pellet was prepared in the same manner as in Example 1, except that, in the polymerization of propylene according to Example 7(f), the feed of nPMDMS was altered to 1.0 mmole/Hr. Table 2 illustrates fundamental properties of the pellet.

Table 3 illustrates the properties of a biaxially oriented film which has been subjected to a stretching processing under the same conditions as in Example 7.

COMPARATIVE EXAMPLE 10

A pellet was prepared in the same manner as in Example 7, except that cyclohexylethyldimethoxysilane (hereinafter referred to as CHEDMS) was used in place of the nPMDMS in the preliminary polymerization of Example 7 (e), and CHEDMS was used in place of the nPMDMS and feed of propylene was altered to 5.0 mmoles/Hr in the polymerization of propylene of Example 7(f). Table 2 illustrates fundamental properties of the pellet thus obtained.

Table 3 illustrates properties of a biaxially oriented film which has been subjected to a stretching processing under the same conditions as in Example 7.

COMPARATIVE EXAMPLE 11

A pellet was prepared in the same manner as in Example 9, except that CHEDMS was used in place of the nPMDMS in the preliminary polymerization of Example 9(e), and CHEDMS was used in place of the nPMDMS and the feed of propylene was altered to 1.25 mmoles/Hr in the polymerization of propylene of example 9(f). Table 2 illustrates fundamental properties of the pellet thus obtained.

Table 3 illustrates properties of a biaxially oriented film which has been subjected to stretching processing under the same conditions as in Example 7.

COMPARATIVE EXAMPLE 12

(a) Preparation of Reduced Product

After replacing the inner atmosphere of a reactor having a capacity of 200 liters with argon gas, 40 liters of dry hexane and 10 liters of titanium tetrachloride were charged. After keeping the solution thus obtained at $-5°$ C., a solution consisting of 30 liters of dry hexane and 23.2 liters of ethylaluminum sesquichloride was dropwise added thereto while keeping the reaction system at a temperature not exceeding $-30°$ C. Then, the reaction mixture was stirred for two hours at the same temperature as above. After the reaction, the reaction mixture was allowed to stand, and the solid matter was separated from the liquid phase and twice washed with each 40 liters portion of hexane to obtain 16 kg of a reduced product.

(b) Preparation of Titanium Trichloride Composition

The reduced product obtained in (a) was made into a slurry in n-decalin having a concentration of 0.2 g/cc, and heat-treated at 140° C. for 2 hours. After the reaction, the supernatant was withdrawn and twice washed with each 40 liters portion of hexane to obtain titanium trichloride composition (A).

(c) Preparation of Titanium Trichloride Solid Catalyst

In 55 liters of toluene, 11 kg of the titanium trichloride composition (A) obtained in (b) was made into a slurry, to which were added iodine and diisoamyl ether so that the molar ratio of titanium trichloride composition (A)/iodine diisoamyl ether came to 1/0.1/1.0. By reacting the mixture at 80° C. for one hour, titanium trichloride solid catalyst (B) was obtained.

(d) Polymerization of Propylene

After sufficiently replacing the inner atmosphere of a polymerization reactor equipped with a stirrer and having a capacity of 200 liters with propylene gas, 68 liters of heptane and 13.6 kg of propylene were charged. After elevating the temperature of the reactor to 60° C., propylene and hydrogen gas were fed so that pressure came to 10 kg/cm$^2$G and the concentration of hydrogen in the gas phase came to 0.5% by mole. Then, 3.1 kg of the above-obtained titanium trichloride solid catalyst (B) and 25 g of diethylaluminum chloride (DEAC) were fed and rinsed into the reaction system with 2 liters of heptane to start a polymerization reaction. Thereafter, the monomer was continuously fed to continue the polymerization for 8 hours while maintaining temperature, pressure and composition of gas phase constant. After stopping the polymerization reaction by addition of isobutanol, 70 liters of heptane having a temperature of 60° C. was added and stirred for 30 minutes. The powdery product was separated by centrifugation and dried to obtain 26.5 kg of a powdery polymer. Subsequently, it was formed into a pellet in the same manner as in Example 1. Table 2 illustrates fundamental properties of the pellet. Then, the polymer pellet thus obtained was subjected to a stretching processing under the same conditions as in Example 7. Table 3 illustrates properties of the biaxially oriented film thus obtained.

TABLE 1

| | | | Conditions of polymerization | | | | | |
| --- | --- | --- | --- | --- | --- | --- | --- | --- |
| | | | | Electron donative compound/ triethyl- | Results of polymerization | | | |
| | | Electron donative compound | Solid catalyst component | aluminum ratio (by mole) | PP/Cat (g/g) | CXS (wt %) | XIS (wt %) | [η] | Mw/Mn |
| Ex 1 | n-Propylmethyldimethoxysilane | Ex 1 (d) | 0.025 | 22,000 | 11.7 | 25.1 | 1.22 | 4.4 |
| Ex 2 | " | " | 0.05 | 25,200 | 4.8 | 25.5 | 1.43 | |
| Ex 3 | " | " | 0.1 | 19,300 | 2.6 | 21.0 | 1.64 | 4.2 |
| Ex 4 | " | " | 0.5 | 8,730 | 1.8 | 49.0 | 1.89 | 4.2 |
| Ex 5 | n-Butylmethyldimethoxysilane | " | 0.05 | 21,000 | 6.0 | 28.4 | 1.28 | 4.0 |
| Ex 6 | n-Hexylmethyldimethoxysilane | " | 0.05 | 18,300 | 5.0 | 15.2 | 1.42 | 4.6 |
| Comp. Ex 1 | Cyclohexylethyldimethoxysilane | " | 0.0048 | 27,300 | 14.6 | 31.9 | 1.22 | 4.4 |
| Comp. Ex 2 | " | " | 0.007 | 32,800 | 9.1 | 42.0 | 1.13 | 4.9 |
| Comp. Ex 3 | " | " | 0.025 | 29,600 | 2.6 | 72.8 | 1.43 | 4.2 |
| Comp. Ex 4 | " | " | 0.05 | 28,600 | 1.3 | 74.6 | 1.84 | 4.2 |

TABLE 1-continued

| | | Conditions of polymerization | | | Results of polymerization | | | |
|---|---|---|---|---|---|---|---|---|
| | Electron donative compound | Solid catalyst component | Electron donative compound/ triethyl- aluminum ratio (by mole) | PP/Cat (g/g) | CXS (wt %) | XIS (wt %) | [η] | Mw/Mn |
| Comp. Ex 5 | n-Propylethyldimethoxysilane | " | 0.1 | 26,300 | 1.3 | 66.6 | 1.80 | 4.2 |
| Comp. Ex 6 | Cyclohexylethyldimethoxysilane | Comp. Ex 6(a) | 0.1 | 20,500 | 2.4 | 72.2 | 1.77 | 4.2 |
| Comp. Ex 7 | Phenyltrimethoxysilane | " | 0.1 | 15,900 | 6.9 | 56.9 | 1.46 | 4.1 |
| Comp. Ex 8 | Methyl methacrylate | Comp. Ex 8(a) | 0.015* | 5,550 | 1.8 | 74.1 | 2.18 | 6.1 |

Ex: Example
Comp. Ex: Comparative Example
*: Electron donative compound/Diethylaluminum chloride ratio (by mole)

TABLE 2

| | Condition of polymerization | | | Results of polymerization | | | |
|---|---|---|---|---|---|---|---|
| | Solid catalyst component | Electron donative compound | Electron donative compound/ Organoaluminum ratio (by mole) | CXS (wt %) | XIS (wt %) | TI (° C.) | MFR (g/10 min) |
| Ex 7 | Ex 7(d) | n-Propylmethyldimethoxysilane | 0.30 | 1.7 | 42.1 | 138.5 | 2.5 |
| Ex 8 | Ex 7(d) | n-Propylmethyldimethoxysilane | 0.15 | 1.8 | 29.0 | 141.0 | 2.3 |
| Ex 9 | Ex 7(d) | n-Propylmethyldimethoxysilane | 0.30 | 2.5 | 40.0 | 141.2 | 2.4 |
| Comp. Ex 9 | Ex 7(d) | n-Propylmethyldimethoxysilane | 0.02 | 4.5 | 25.1 | 136.2 | 2.3 |
| Comp. Ex 10 | Ex 7(d) | Cyclohexylethyldimethoxysilane | 0.10 | 1.2 | 74.6 | 151.0 | 2.3 |
| Comp. Ex 11 | Ex 7(d) | Cyclohexylethyldimethoxysilane | 0.03 | 2.5 | 72.8 | 148.4 | 2.3 |
| Comp. Ex 12 | Comp. Ex 12(c) | ε-Caprolactone | 0.02 | 1.7 | 73.2 | 148.7 | 1.3 |

Ex: Example
Comp. Ex: Comparative Example

TABLE 3

| | Film properties | | | | |
|---|---|---|---|---|---|
| | Haze | Young's modulus (kg/cm$^2$) | | Dimensional stability | |
| | (%) | MD | TD | (%) | Stretchability |
| Example 7 | 0.2 | 19800 | 36900 | 0.88 | ○ |
| Example 8 | 0.2 | 19700 | 36200 | 0.90 | ○ |
| Example 9 | 0.3 | 17700 | 33100 | 1.00 | ○ |
| Comparative Example 9 | 0.3 | 16200 | 30700 | 1.38 | ○ |
| Comparative Example 10 | 1.0 | 19500 | 40600 | 0.68 | x |
| Comparative Example 11 | 0.9 | 18700 | 33900 | 0.87 | x |
| Comparative Example 12 | 0.6 | 19400 | 39300 | 0.80 | x |

EFFECT OF THE INVENTION

The present invention provides an α-olefin polymer free from stickiness and excellent in processabilities such as stretchability, an α-olefin polymerizing catalyst for obtaining such α-olefin polymer, and a process for producing such α-olefin polymer. Further, the polypropylene provided by the present invention for production of a biaxially oriented film is excellent in stretchability and the biaxially oriented film obtained by subjecting the polypropylene to a stretching processing is excellent in stiffness and dimensional stability and successfully usable as a packaging material and the like.

Figure 1:
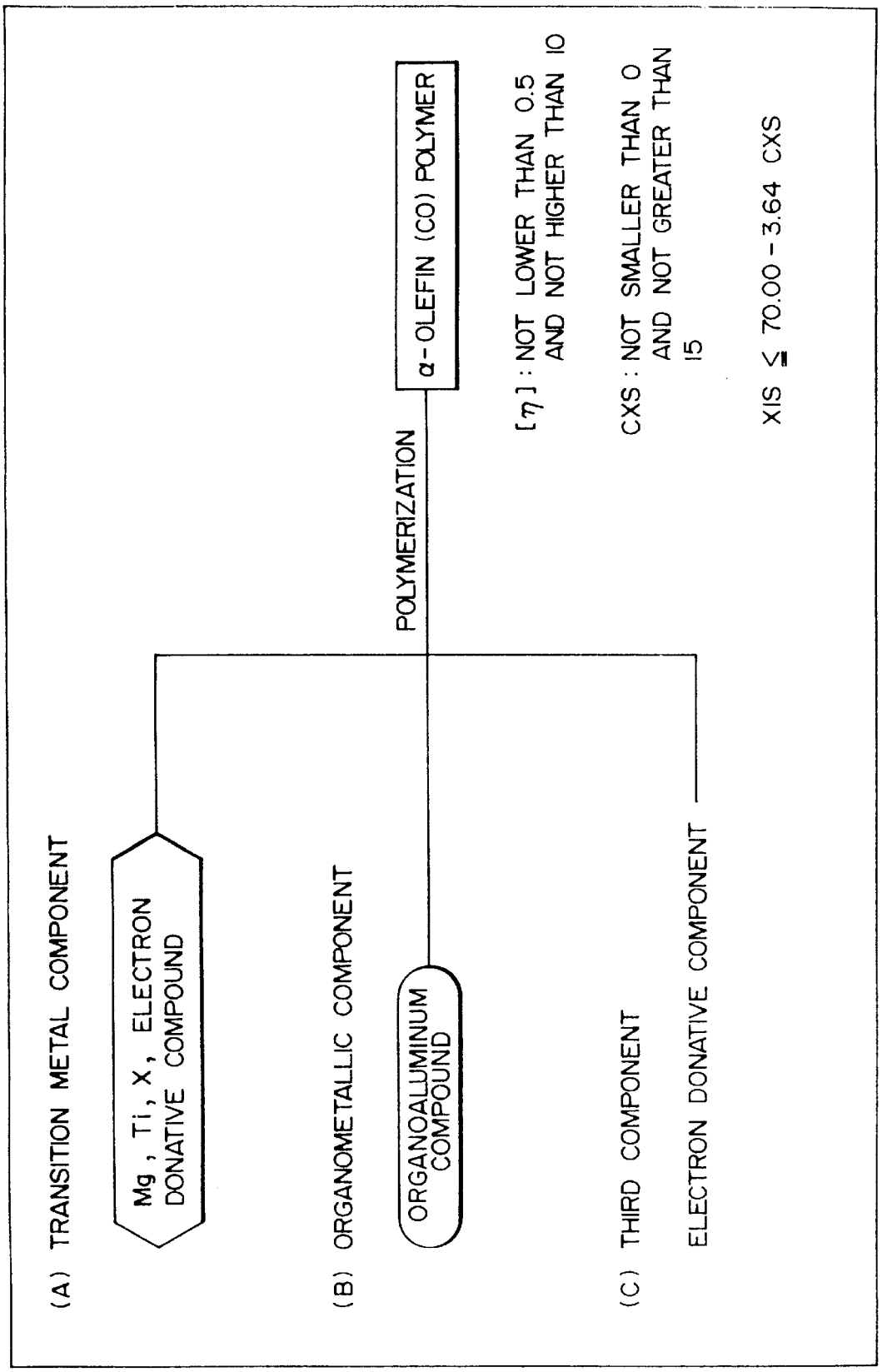
FIG. 1 is a flow chart for facilitating understanding of the present invention. This flow chart is a typical example of the embodiments of the present invention, and the present is by no means limited thereby.

What is claimed is:

1. An α-olefin polymerizing catalyst consisting of
   (A) a solid catalyst component produced by reducing an alkoxytitanium compound with an organo-magnesium compound in the presence of an organic silicon compound having a Si—O bond to obtain a solid product, followed by treating said solid product with an ester compound, an ether compound and titanium tetrachloride,
   (B) an organoaluminum compound, and
   (C) an organic silicon compound represented by the following formula:

$$R^{13}R^{14}Si(OR^{15})_2,$$

wherein $R^{13}$ represents a $C_1$–$C_{20}$ straight chain alkyl group, $R^{14}$ represents methyl and $R^{15}$ represents a $C_1$–$C_5$ hydrocarbon group, for use in the production of an α-olefin polymer which is an α-olefin polymer obtained by polymerizing an α-olefin having 3 or more carbon atoms and satisfying the following conditions: the Intrinsic viscosity [η] of said polymer is not lower than 0.5 and not higher than 10, and
   20° C. xylone-soluble fraction (CXS) content (% by weight) and 105° C. xylene-insoluble fraction (XIS) content (% by weight) of said polymer satisfy the following condition:

$$XIS \leq 70.00 - 3.64 CXS$$

provided that CXS is not smaller than 0 and not greater than 15.

2. An α-olefin polymerizing catalyst according to claim 1, wherein said α-olefin having 3 or more carbon atoms is propylene.

3. The α-olefin polymerizing catalyst according to claim 1 or 2, wherein the ester compound is an ester of mono- or poly-carboxylic acid.

4. The α-olefin polymerizing catalyst according to claim 1 or 2, wherein the organic silicon compound having a Si—O bond is a silicon compound represented by the following general formula:

$$R^2_n Si(OR^3)_{4-n}$$

wherein $R^2$ represents a hydrocarbon group having 1–20 carbon atoms or a hydrogen atom, $R^3$ represents a hydrocarbon group having 1–20 carbon atoms, and n represents a number satisfying $0 \leq n \leq 4$.

5. The α-olefin polymerizing catalyst according to claim 1 or 2, wherein the ether compound is a dialkyl ether compound.

6. The α-olefin polymerizing catalyst according to claim 1, wherein $R^{15}$ is a methyl group.

7. A polypropylene for use in the production of a biaxially oriented film obtained by carrying out a polymerlzation reaction in the presence of a catalyst system consisting of:
   (A) a solid catalyst component produced by reducing an alkoxytitanium compound with an organo-magnesium compound in the presence of an organic silicon compound having a Si—O bond to obtain a solid product, followed by treating said solid product with an ester compound, an ether compound and titanium tetrachloride,
   (B) an organoaluminum compound, and
   (C) an organic silicon compound represented by the following formula:

$$R^{13}R^{14}Si(OR^{15})_2,$$

wherein $R^{13}$ represents a $C_1$–$C_{20}$ straight chain alkyl group, $R^{14}$ represents methyl and $R^{15}$ represents a $C_1$–$C_5$ hydrocarbon group, said polypropylene satisfying the following conditions (1) to (3):
   (1) the content of 20° C. xylene-soluble fraction(CXS) is 3.5% by weight or less,
   (2) the content of 20° C. xylene-soluble fraction (CXS, % by weight) and the content of 105° C. xylene-insoluble fraction (XIS, % by weight) satisfy the following condition:

$$XIS \leq 70.00 - 3.64 CXS, \text{ and}$$

(3) melt flow rate (MFR) at 230° C. is from 0.5 to 10.0 g/10 minutes.

8. A polypropylene for use in the production of a biaxially oriented film according to claim 7, wherein the temperature at which said polypropylene shows a complex elastic modulus of $1 \times 10^9$ dynes/cm² when a vibration of 110 Hz is applied to the polypropylene is in the range of from 134° C. to 152° C.

9. A polypropylene for use in the production of a biaxially oriented film according to claim 7, wherein the temperature at which said polypropylene shows a complex elastic modulus of $1 \times 10^9$ dynes/cm² when a vibration of 110 Hz is applied to the polypropylene is in the range of from 137° C. to 145° C. and melt flow rate (MFR) of the polypropylene at 230° C. is in the range of from 1.0 to 8.0 g/10 minutes.

10. The polypropylene according to claim 7, wherein the ester compound is an ester of mono- or poly-carboxylic acid.

11. The polypropylene according to claim 7, wherein the organic silicon compound having a Si—O bond is a silicon compound represented by the following general formula:

$$R^2_n Si(OR^3)_{4-n}$$

wherein, $R^2$ represents a hydrocarbon group having 1–20 carbon atoms or a hydrogen atom, $R^3$ represents a hydrocarbon group having 1–20 carbon atoms, and n represents a number satisfying $0 \leq n \leq 4$.

12. The polypropylene according to claim 7, wherein the ether compound is a dialkyl ether compound.

13. The polypropylene according to claim 7, wherein $R^{15}$ is a methyl group.

14. A process for producing an α-olefin polymer which comprises producing an α-olefln polymer that satisfies the following conditions:
    the intrinsic viscosity [η] of said polymer is not lower than 0.5 and not higher than 10, and
    20° C. xylene-soluble fraction (CXS) content (% by weight) and 105° C. xylene-insoluble fraction (XIS) content (% by weight) of said polymer satisfy the following condition:

$$XIS \leq 70.00 - 3.64 CXS$$

provided that CXS is not smaller than 0 and not greater than 15, by polymerizing an α-olefin having 3 or more carbon atoms in the presence of a catalyst system consisting of
    (A) a solid catalyst component produced by reducing an alkoxytitanium compound with an organo-magnesium compound in the presence of an organic silicon compound having a Si—O bond to obtain a solid product, followed by treating said solid product with an ester compound, an ether compound and titanium tetrachloride, (B) an organoaluminum compound, and
(C) an organic silicon compound represented by the following formula:

$$R^{13}R^{14}Si(OR^{15})_2,$$

wherein $R^{13}$ represents a $C_1$–$C_{20}$ straight chain alkyl group, $R^{14}$ represents methyl and $R^{15}$ represents a $C_1$–$C_5$ hydrocarbon group.

15. A process for producing an α-olefin polymer according to claim 14, wherein said α-olefin having 3 or more carbon atoms is propylene.

16. The process according to claim 14 or 15, wherein the ester compound is an ester of mono- or poly-carboxylic acid.

17. The process according to claim 14 or 15, wherein the organic silicon compound having a Si—O bond is a silicon compound represented by the following general formula:

$$R^2{}_nSi(OR^3)_{4-n}$$

wherein $R^2$ represents a hydrocarbon group having 1–20 carbon atoms or a hydrogen atom, $R^3$ represents a hydrocarbon group having 1–20 carbon atoms, and n represents a number satisfying $0 \leq n \leq 4$.

18. The process according to claim 14 or 15, wherein the ether compound is a dialkyl ether compound.

19. The process according to claim 14, wherein $R^{15}$ is a methyl group.

20. A biaxially oriented film obtained by subjecting a polypropylene for use in the production of a biaxially oriented film according to one of claims 7 to 9 to a stretching processing.

21. A process for the preparation of a biaxially oriented film from polypropylene,
   wherein said process comprises carrying out a polymerization reaction to produce polypropylene from propylene and a catalyst system consisting of:
   (A) a solid catalyst component produced by reducing an alkoxytitanium compound with an organo-magnesium compound in the presence of an organic silicon compound having a Si-O bond to obtain a solid product, followed by treating said solid product with an ester compound, an ether compound and titanium tetrachloride,
   (B) an organoaluminum compound, and
   (C) an organic silicon compound represented by the following formula:

$$R^{13}R^{14}Si(OR^{15})_2,$$

wherein $R^{13}$ represents a $C_1$–$C_{20}$ straight chain alkyl group, $R^{14}$ represents methyl and $R^{15}$ represents a $C_1$–$C_5$ hydrocarbon group,
   wherein said polypropylene satisfies the following conditions (1) to (3):
   (1) the content of 20° C. xylene-soluble fraction(CXS) is 3.5% by weight or less,
   (2) the content of 20° C. xylene-soluble fraction (CXS, % by weight) and the content of 105° C. xylene-insoluble fraction (XIS, % by weight) satisfy the following condition:

$$XIS \leq 70.00-3.64CXS, \text{ and}$$

(3) melt flow rate (MFR) at 230° C. is from 0.5 to 10.0 g/10 minutes,
   wherein said polypropylene is subjected to a stretching process to produce a biaxially oriented film.

22. A process for the production of polypropylene from propylene,
   wherein said polypropylene satisfies the following conditions (1) to (3):
   (1) the content of 20° C. xylene-soluble fraction(CXS) is 3.5% by weight or less,
   (2) the content of 20° C. xylene-soluble fraction (CXS, % by weight) and the content of 105° C. xylene-insoluble fraction (XIS, % by weight) satisfy the following condition:

$$XIS \leq 70.00-3.64CXS, \text{ and}$$

(3) melt flow rate (MFR) at 230° C. is from 0.5 to 10.0 g/10 minutes,
   wherein said process is carried out in the presence of a catalyst system consisting of the following components:
   (A) a solid catalyst component produced by reducing an alkoxytitanium compound with an organo-magnesium coumpound in the presence of an organic silicon compound having a Si-O bond to obtain a solid product, followed by treating said solid product with an ester compound, an ether compound and titanium tetrachloride,
   (B) an organoaluminum compound, and
   (C) an organic silicon compound represented by the following formula:

$$R^{13}R^{14}Si(OR^{15})_2,$$

wherein $R^{13}$ represents a $C_1$–$C_{20}$ straight chain alkyl group, $R^{14}$ represents methyl and $R^{15}$ represents a $C_1$–$C_5$ hydrocarbon group,
   wherein said process comprises a preliminary polymerization and a main polymerization process,
   wherein said preliminary polymerization process comprises:
      reacting a small amount of propylene in the presence of component A and component B in a slurry state, and
   wherein said preliminary polymerization process occurs prior to said main polymerization process.

23. A process according to claim 22,
   wherein said preliminary polymerization is carried out in the presence of component (C).

* * * * *